United States Patent
Endo et al.

[11] Patent Number: 5,932,341
[45] Date of Patent: Aug. 3, 1999

[54] BIAXIALLY ORIENTED MULTILAYERED FILM

[75] Inventors: Kouhei Endo; Hiroshi Tokuda, both of Sagamihara, Japan

[73] Assignee: Teijin Limited, Osaka, Japan

[21] Appl. No.: 08/861,018

[22] Filed: May 21, 1997

[30] Foreign Application Priority Data

May 24, 1996 [JP] Japan ................... 8-129862
May 24, 1996 [JP] Japan ................... 8-129863

[51] Int. Cl.⁶ ............. B32B 27/08; B32B 27/18; B32B 27/32; B32B 27/36
[52] U.S. Cl. ............. 428/327; 428/331; 428/480; 428/483; 428/523; 428/41.3; 428/41.8
[58] Field of Search ................ 428/40.1, 41.3, 428/41.8, 323, 327, 331, 480, 483, 910, 523

[56] References Cited

U.S. PATENT DOCUMENTS 4,767,654 8/1988 Riggsbee ................. 428/40

FOREIGN PATENT DOCUMENTS

| 5130862 | 3/1976 | Japan . |
| 56113427 | 9/1981 | Japan . |
| 57176125 | 10/1982 | Japan . |
| 585226 | 1/1983 | Japan . |
| 60178031 | 9/1985 | Japan . |
| 2-036517 | 2/1990 | Japan . |
| 236517 | 2/1990 | Japan . |
| 2131994 | 5/1990 | Japan . |

OTHER PUBLICATIONS

Schmitz, Peter et al., "Films." Ullmann's Encyclopedia Of Industrial Chemistry, 5th Ed., vol. A11, pp. 85–94, 96–102, 105–106, 1988.

*Primary Examiner*—Vivian Chen
*Attorney, Agent, or Firm*—Sughrue, Mion, Zinn, MacPeak & Seas, PLLC

[57] ABSTRACT

The present invention provides multilayered film made of the multiple layers characterized in that at least one polymer layer (A) comprising the aromatic polyester(A), and at least one polymer layer(B) comprising olefinic polymer(B), which is containing silica or cross-linked silicone resin particles with an average particle diameter of 0.01 to 2 microns, with the melt flow index (MFR value) of 0.5 to 50 g/10 min., are laminated alternately with adhesion among these layers ranging from 0.1 to 20 g/cm. wherein the polymer layer A forming the outermost layer; and the number of electric discharge marks is 5 or less per square meter on the polymer layer A when the polymer layers A and B are separated; further, said multilayered film provides the film products with minimum inclusion of foreign substances or electric discharge marks, since a minimum amount of electric charge is produced when they are separated from said multilayered film.

14 Claims, No Drawings

BIAXIALLY ORIENTED MULTILAYERED FILM

BACKGROUND OF THE INVENTION

1. Field of the Invention

The present invention relates to the biaxially oriented multilayered film featuring easy separation. More specifically, this invention relates to the biaxially oriented multilayered film which comprises the mutually incompatible polymer layer of the aromatic polyester and olefinic polymer and which provides single layered films with the minimum electric discharge marks caused when the single layer film is obtained by separation of the multilayered film or the minimum fault due to electrically charged foreign substances caused by electric charge during separation.

2. Description of Related Art

The barcode based systems are currently used in the extensive field for transportation and distribution, process control in the plant, etc. There has been a growing demand for thermal ink-transfer printing ribbon used in this system. In the field of magnetic recording, there is also an increasing need for QIC (4/1-inch data cartridge) tape.

The film used for these purposes is thin, and there are many troubles such as breakdown of the film in the production process; productivity is low. To improve productivity and production economy, Japanese Patent Laid-Open Nos. TOKKAISHO 51-30862(1976), TOKKAISHO 56-113427 (1981), TOKKAISHO 57-176125(1982), TOKKAISHO 58-5226(1983), TOKKAISHO 60-178031(1985), TOKKAIHEI 2-36517(1990) and TOKKAIHEI 2-131994(1990) disclose the method wherein the mutually incompatible polymers are co-extruded to get the multilayered film by at least uniaxial orientation of the resulting non-oriented film, and two or more products are produced by separating the single layered film from said multilayered film.

The inventors of the present invention have found out that, when the single layered film is separated from the multilayered film according to the method, film is electrically charged and foreign substances attach to the film in the separation, slitting or winding process. If charged voltage is increased, it is discharged resulting in discharge marks on the film. These foreign substances and electric discharge marks will cause such problems as rejection of ink or magnetic coat in the painting process on the film, for example, decrease of the yield in the painting process due to pimples on the roll surface generated by the foreign substances, and increased dropout due to magnetic coating stains.

Said electric charge can be eliminated and neutralized by an electric charge eliminator bar installed at the separation point. However, this method allows charged potential to be reduced to some extent, but fails to remove the discharge marks.

Another way is to apply static eliminating agent to each layer composing the multilayered film, but the bleed type static eliminating agent is incapable of working effectively for the multilayered film; furthermore, it gives rise to another problem such as surface contamination due to bleeding out of the static eliminating agent.

SUMMARY OF THE INVENTION

The object of the present invention is to prevent electric discharge due to charging when the single layer film is obtained by separation of the multilayered film, thereby providing a biaxially oriented multilayered film which can easily be made into single layered films with the minimum or no electric discharge marks or without foreign substances rolled into the film resulting from electric charge during separation.

Another object of the present invention is to prevent electric discharge due to charging when the single layer film is obtained by separation of the multilayered film, thereby providing a biaxially oriented multilayered film which can easily be made into single layered films with the minimum or no electric discharge marks, or without foreign substances rolled into the film resulting from electric charge during separation, and without surface fault due to transfer from other adjacent layers.

Still another objective of the present invention is to provide polyester film (single layered film) separated from the biaxially oriented multilayered film.

Further objective of the present invention is to provide olefinic polymer film (single layered film) separated from the biaxially oriented multilayered film.

Still further objectives and advantages of the present invention will be made clear from the following descriptions:

According to the present invention, said objectives and advantages of the present invention can be achieved by the biaxially oriented multilayered film characterized in that;

(A) at least one first polymer layer comprising the aromatic polyester, and (B) at least one second polymer layer comprising the olefinic polymer, wherein (a) melt flow index is 0.5 to 50 g/10 min., and
  (b) 0.01 to 5 wt % of at least one type of silicon-containing fine particles selected from silica and cross-linked silicone resin particles having an average particle diameter of 0.01 to 2 microns are contained as static eliminating agent for separation, (C) are laminated alternately with adhesion among these layers ranging 0.1 to 20 g/cm., (D) where the first polymer layer A forming the outermost layer; and (E) the number of electric discharge marks is 5 or less per square meter on the first polymer layer A when the first polymer layer A and the second polymer layer B are separated.

DETAILED DESCRIPTION OF THE INVENTION

In the present invention, aromatic polyester (A) as a constituent of the first polymer layer A is thermoplastic resin substantially incompatible with olefinic polymer (B). The difference of solubility parameters (SP values) of said aromatic polyester (A) and olefinic polymer (B) is preferred to be one or more, preferably, two or more. This will facilitate high-speed separation of the first polymer layer (A) and second polymer layer (B) from the multilayered film, and will minimize breakdown during separation.

This aromatic polyester (A) is linear polyester comprising aromatic dicarboxylate component and glycol component. Aromatic polyester using aliphatic diol with the carbon number of 2 to 10 as glycol component is particularly preferred.

Said aromatic dicarboxylate component can be exemplified by terephthalic acid, 2,6-naphthalene dicarboxylic acid, isophthalic acid and 4,4'-diphenyl dicarbonoxylic acid. Of them, terephthalic acid and 2,6-naphthalene dicarboxylic acid are particularly preferred.

Furthermore, glycol component can be exemplified by ethylene glycol, propylene glycol, 1,4-butane diol, 1,5-pentane diol, 1,6-hexane diol, 1,4-cyclohexane dimethanol, diethylene glycol and neopentyl glycol. Of these, ethylene glycol and 1,4-butane diol are particularly preferred.

As said aromatic polyester, polyethylene terephthalate series, polyethylene 2,6-naphthalene dicarboxylate series, polybutylene terephthalate series and polyhexamethylene terephthalate series polymers are preferred because they provide improved mechanical and thermal characteristics of the polyester single layered film separated from the multilayered film. Of these, polyethylene terephthalate series and polyethylene 2,6-naphthalene dicarboxylate series polymers are particularly preferred.

Aromatic polyester (A) in the present invention may be a homopolymer or copolymer. In the case of copolymer, polyester obtained by copolymerization of dicarboxylic acid component or glycol components at the rate of 20 mol % or less for the total dicarboxylic acid component, for example, is preferred. It may be copolyester obtained by copolymerization of a small amount of multifunctional (tri-functional or more) polyvalent compound in the range (3 mol % or less, for example) where polyester is substantially linear.

For said copolymer, the acid component can be illustrated preferably by the examples of isophthalic acid, 2,6-naphthalene dicarboxylic acid, 4,4'-diphenyl dicarboxylic acid, and adipic acid in the case of the copolymer polyethylene terephthalate and the glycol component can be shown preferably by propylene glycol, 1,4-cyclohexane dimethanol, 1,6-hexane glycol, diethylene glycol and neopentyl glycol. The copolymer component of copolymer polyethylene 2,6-naphthalene dicarboxylate is shown preferably by terephthalic acid, isophthalic acid, 4,4'-diphenyl carboxylic acid and adipic acid and the glycol component is exemplified preferably by propylene glycol, 1,4-cyclohexane dimethanol, 1, 6-hexane glycol, diethylene glycol and neopentyl glycol. For the copolymer component of the copolymer polybutylene terephthalate, the acid component can be exemplified preferably by isophthalic acid, 2,6-naphthalene dicarboxylic acid, 4,4'-dephenyl dicarboxylic acid and adipic acid and the glycol component is illustrated preferably by such examples as ethylene glycol, 1,6-hexane diol, propylene glycol, 1,5-pentane diol, 1,4-cyclohexane dimethanol, diethylene glycol and neopentyl glycol. The copolymer component of the copolymer polyhexamethylene terephthalate can be given preferably by isophthalic acid, 2,6-naphthalene dicarboxylic acid and 4,4'-diphenyl dicarboxylic acid as acid components and the glycol components include such examples as ethylene glycol, 1,4-butane diol, propylene glycol, 1,5-pentane diol, 1,4-cyclohexane dimethanol, diethylene glycol and neopentyl glycol.

Copolymer components for the aromatic polyester can be exemplified, in addition to said components, by hexahydroterephthalic acid, adipic acid, sebacic acid, dodecane dicarboxylic acid and other dicarboxylate components, 1,3-propane diol, polyethylene glycol, polytetramethylene glycol, dipropylne glycol, triethylene glycol, bisphenol A and other glycol components.

Home polymer or copolymer can be used independently for said aromatic polyester and their blended components can also be used.

For the aromatic polyester (A) constituting the first polymer layer (A), volume resistance in the molten state is preferred not to exceed $0.5 \times 10^9$ ohm.cm at the temperature 15 degrees Celsius higher than the melting point (Tm) under the test condition of 50 Hz AC voltage. When the intrinsic volume resistance is within the range, strong static electric charge is applied to the multilayered film in casting process, and provides an excellent contact between the cooling drum and multilayered film. Aromatic polyester having such an intrinsic volume resistance can be obtained by blending of the compound containing alkaline metal salt (e.g., sodium acetate, potassium acetate, lithium acetate), or by copolymerization of bi-functional compound containing sulfonic acid quaternary phosphonium base (such as: 3,5-dicarboxybenzenesulfotetrabutyl phosphonium; 3,5-dicarboxybenzenesulfoethyltributyl phosphonium; 3,5-dicarboxybenzenesulfobenzyltributyl phosphonium: 3,5-dicarboxybenzenesulfophenyltributyl phosphonium; 3,5-dicarboxybenzenesulfotetraphenyl phosphonium; 3,5-dicarboxybenzenesulfoethyltriphenyl phosphonium; 3,5-dicarboxy-benzenesulfobutyltriphenyl phosphonium; and 3,5-dicarbomethoxybenzenesulfotetrabutyl phosphonium). This will ensure excellent contact between the multilayered film extruded from the dies and the cooling drum.

Furthermore, in order to improve the winding properties of the multilayered film itself or the polymer layer separated from the multilayered film (single layered film) and to provide surface characteristics in conformity to characteristics requirements in particular application, aromatic polyester (A) can be made to contain organic or inorganic fine particles with the average particle diameter of about 0.001 to 5 microns, preferably 0.005 to 3 microns at the blending ratio of 0.01 to 2 wt % (with respect to polyester), for example. Such fine particles can be exemplified by silica according to dry method, silica according to the wet method, zeolite, calcium carbonate, calcium phosphate, kaolin, kaolinite, clay, talc, titanium oxide, alumina, zirconia, aluminum hydroxide, calcium oxide, graphite, carbon black, zinc oxide, silicon carbonate, silver oxide and other inorganic particles, cross-linked acryl resin particles, cross-linked polystylene resin particles, melamine resin particles, cross-linked silicone resin particles and other organic particles.

The aromatic polyester (A) itself in the present invention is already known. It is preferred to have an intrinsic viscosity (ortho chlorophenol, 35 degrees Celsius) of 0.5 at least.

If required, anti-oxidant, anti-static agent, coloring agent, pigment, fluorescent whitening agent, plasticizer, ultraviolet ray absorber, and other resins can be added to the aromatic polyester (A).

According to the present invention, the olefinic polymer (B) as the constituent of the second polymer layer (B) has the melt flow index (hereinafter referred to as "MFR") of 0.5 to 50 g/10 min., preferably 3 to 50 g/10 min., more preferably 10 to 45 g/10 min., or still more preferably 20 to 40 g/10 min. This olefinic polymer is preferred to have a melting point of 100 to 240 degrees Celsius, more preferably from 150 to 240 degrees Celsius.

The olefinic polymer is the olefinic compound, or preferably, alpha-olefinic homopolymer or copolymer having a carbon number of 2 to 10. This alpha-olefin having a carbon number of 2 to 10 is exemplified by ethylene, 1-propene, 1-butene, 1-pentene, 4-methyl-1-pentene, 1-hexene, 1-octene and 1-nonene.

Concrete examples of this olefinic polymer includes low density polyethylene, high density polyethylene, polypropylene, polybutene, polypentene (polymethylpentene, etc.), polybutadiene, homopolymer or their copolymers. Furthermore, the copolymer of said olefinic polymer includes the copolymer formed by acid component grafted onto part of the polymer chain. This grafted copolymer component is exemplified by maleic acid and other carboxylic acid components.

Polypropylene is particularly preferred as olefinic polymer. Preferred examples include polypropylene homopolymer, random copolymer polypropylene (e.g., ethylene-propylene random copolymer), block copolymer polypropylene (e.g., ethylene-propylene block copolymer), and ethylene-propylene rubber. Of these, copolymer polypropylene, especially, ethylene-propylene copolymer and polymethylpentene (polypentene) are preferred.

Furthermore, olefinic polymer (B) according to the present invention is the olefinic polymer having a MFR value of 0.5 to 50 g/10 min., as described above. This MFR value is 3 to 50 g/10 min., more preferably, 10 to 45 g/10 min., or still more preferably, 20 to 40 g/10 min. The preferred range of this MFR value varies slightly according to the type of the polymer. For example, the MFR value of polypropylene homopolymer (copolymer component not exceeding 3 mol %) is 0.5 to 15 g/10 min., or more preferably 3 to 15 g/10 min. The MFR value of polypropylene copolymer (copolymer component 3 mol % or more) is 0.5 to 50 g/10 min., more preferably 3 to 50 g/10 min., still more preferably 10 to 45 g/10 min., or still more preferably 20 to 40 g/10 min. If this MFR value is below 0.5 g/10 min., the filter pressure, particularly, fine filter pressure is increased when multilayered film is produced by melting. Then practically sufficient extrusion cannot be provided for formation of thick film or high speed film formation. This may lead to problems resulting in filter damage or overload of the extruder. Rise of the filter pressure can be prevented to some extent by increasing the filter area (increasing the number of filters, for example), but these measures are subjected to the restrictions of the costs and filter housings. Furthermore, when the MFR value has exceeded 50 g/10 min., melt-extrusion will be unstable, and unevenness of the film thickness will increase. Furthermore, protrusions due to silica contained in the olefinic polymer will be transcribed onto the polymer layer (A). This may result in deterioration of the characteristics of the surface of the polymer layer (A).

Olefinic polymer (B), according to the present invention, contains 0.01 to 5 wt % or preferably 0.01 to 2 wt % of at least one type of silicon-containing fine particles selected from silica and cross-linked silicone resin particles having an average particle diameter of 0.01 to 2 microns are contained as a static discharge preventing agent for separation. Said silica is exemplified by dry silica and wet silica. Said cross-linked resin particle, for example, is preferred to be the silicone resin particle which has the bond unit of 80 wt % or more, of the bond expressed by the following equation (1):

$$RSiO_{3/2} \tag{1}$$

(where R: at least one type selected from alkyl group with carbon number of 1 to 6 and phenyl group)

Said bond unit signifies the following structural formula (2):

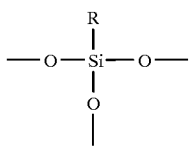

where R is as defined above.

The production method of said cross-linked silicone resin particle is public disclosed. Such disclosed methods include the production method by hydrolysis and condensation of organotrialkyloxyl silane (Japanese Official Patent Gazette TOKKOSHO 40-14917(1965) and TOKKOHEI 2-22767 (1991), etc.) and the production method for polymethylsilsesquioxane fine particle using methyltrichlorosilane as a starting material (Patent No. 572412 in Belgium). However, the production method according to the present invention is not limited only; cross-linked silicone resin particle manufactured by any method may be used.

R in said equation (1) and structural formula (2) is at least one type selected from alkyl groups having the carbon number of 1 to 6 and phenyl groups. Said alkyl group includes methyl, ethyl, butyl, pentyl and hexyl, etc., and more than one type of them can be used. In the case of more than one R, for example, in the case of ethyl and methyl, a mixture of methyltrimethoxy silane, and ethyltrimethoxy can be used as starting material for its production. However, when the production cost and ease of synthesis are taken into account, the fine particle of silicone resin (polymethylsilsesquioxane) having methyl groups as R, is preferred.

This cross-linked silicone resin particle can be of any shape, but is preferred to be substantially true spherical.

If these silicone-containing fine particle is added and mixed with olefinic polymer, it is possible to control the increase of difference in electric charges between the polymer layer (A) and polymer layer (B) when polymer layer (A) or polymer layer (B) is separated from the multilayered film, and to prevent defects on the film surface such as discharge marks due to electric discharging between two layers. Such detects as discharge marks cause problems; for example, the paint will be rejected when the ink or magnetic paint is applied to the film.

According to the present invention to ensure excellent contact between the multilayered film and a casting drum when the multilayered film is produced by melting method, 0.001 to 1 wt % of sulfonic acid quaternary phosphonium salt (per olefinic polymer), for example, is preferred to be added as additive to the olefinic polymer (B). In this case, it is possible to use the sulfonic acid quaternary phosphonium base shown in the description of the aromatic polyester.

For this olefinic polymer (B), the volume resistance under the molten conditions at the temperature 15 degrees Celsius higher than its melting point (Tm) is preferred to be $0.5 \times 10^9$ ohm.cm or less under the 50 Hz AC voltage test condition. If the volume resistance is within this range, strong electric charge is applied to the multilayered film in casting, and provides an excellent contact between the cooling drum and multilayered film.

Furthermore, in order to improve the winding properties of the separated polymer layer (B) and to provide surface characteristics in conformity to characteristics requirements in particular application, it is possible to mix the olefinic polymer (B) with organic or inorganic fine particles with the average particle diameter of about 0.001 to 5 microns, preferably 0.01 to 3 microns (except for the silica and cross-linked silicone resin particles) at the blending ratio of 0.01 to 5 wt %, or preferably 0.01 to 3 wt %, for example. Such fine particles can be exemplified by zeolite, calcium carbonate, calcium phosphate, kaolin, kaolinite, clay, talc, titanium oxide, alumina, zirconia, aluminum hydroxide, calcium oxide, graphite, carbon black, zinc oxide, silicon carbonate, silver oxide and other inorganic particles, cross-linked acryl resin particles, cross-linked polystylene resin particles, melamine resin particles, cross-linked silicone resin particles and other organic particles.

If required, other additives such as anti-oxidant, anti-static agent, coloring agent, pigment, fluorescent whitening agent, plasticizer, ultraviolet ray absorber, and other resins can be added to the olefinic polymer (B). However, other additives do not include lubricant which turns liquid at the temperature equal to or below the film making temperature; for example, they do not contain the lubricant having a melting point or softening point of 200 degrees Celsius or less. These lubricant bleed out to the surface of the polymer layer (B), and deteriorates surface characteristics of the polymer layer (A). To adjust interlaminar adhesion between polymer layer (A) and polymer layer (B), it has been recommended to blend the olefinic polymer (B) with 0.001 wt % or preferably 0.005 to 0.5 wt % of lubricant, for example. However, the film according to the present invention must be distinguished from the conventional one in that said lubricant is not included.

In the multilayered film according to the present invention, at least one polymer layer (A) comprising said aromatic polyester resin (A), and at least one polymer layer comprising said olefinic polymers (B) substantially incompatible with this aromatic polymer resin (A) are adjacent to each other, and interlaminar adhesion between two adjacent layers is within the range from 0.1 to 20 g/cm or preferably 0.1 to 10 g/cm.

The multilayered film according to the present invention is not subjected to any restriction in the number of layers or their form, provided that at least one of polymer layers (A) (hereinafter may be referred to as "layer A") and at least one of polymer layers (B) (hereinafter may be referred to as "layer B") are adjacent to each other, and polymer layer (A) is located at the outermost layer. Preferred configurations of such multilayered film can be exemplified by three-layer film comprising layers A/B/A and five-layer film comprising layers A/B/A/B/A, for example.

Furthermore, the multilayered film according to the present invention has the interlaminar adhesion between adjacent polymer layers of 0.1 to 20 g/cm, or preferably 0.1 to 10 g/cm. If this interlaminar adhesion is smaller than 0.1 g/cm, interlaminar separation and displacement will occur when film is rolled for storage or is transported. Moreover, wrinkles or breakdown will occur, and layers will be peeled off when film is unoriented. If the interlaminar adhesion exceeds 20 g/cm, the film may be broken or may have pin holes when the multilayered film is separated—such problems are not preferable.

The multilayered film according to the present invention has excellent resistance against electric discharge resulting from separation, and is characterized in that, when polymer layer (A) and polymer layer (B) are separated at the rate of 150 m/min. or preferably 300 m/min., the number of discharge marks on the surface of polymer layer (A) does not exceed five per square meter, or preferably three per square meter. If the number of marks per square meter is six or more, ink or magnetic paint will be rejected when the film is printed or coated with magnetic paint. This will raise such problems as increased flaws of printing and increased drop-out due to coating stain of magnetic paint. When olefinic polymer is a homopolymer, discharge marks are likely to occur, so separation speed is preferred to be slow.

The multilayered film according to the present invention is a biaxially oriented film, and is preferred because it provides biaxially oriented film of aromatic polyester with excellent mechanical characteristics. The thickness of multilayered film is not subjected to any restriction. It is preferred that the overall thickness of the multilayered film be 5 to 100 microns or 5 to 50 microns in particular, and the thickness of each of the layers A be 0.2 to 100 microns or 0.5 to 30 microns in particular, while the thickness of each of the layers B be 0.5 to 50 microns or 1 to 30 microns in particular. The total thickness of layer A with respect to the overall thickness of the multilayered film is preferred to be 5 to 80% or 15 to 70% in particular.

The multilayered film according to the present invention is manufactured by the following process: The multilayered melt film comprising layers A and B of above configuration, for example, is co-extruded on the rotary cooling drum; then static charge is applied to the molten surface of the multilayered melt film in the vicinity where said multilayered melt film reaches the rotary cooling drum; then the film is brought into close contact with the rotary cooling drum and cooled, and the resulting unoriented multilayered film is subjected to bidirectional orientation at the specified temperature.

For example, olefinic polymer and aromatic polyester are separately supplied to different extruders, and are heated and molten at the temperature above the melting point of each polymer without exceeding 350 degrees Celsius. Both Molten polymers are fed and placed together in the feed tube or molding die, and are made into multilayered form. The resulting polymer is discharged from the die. While the discharged film is statically charged, it is cooled by the cooling drum. This process will provide unoriented multilayered film. In this melt film formation process, the olefinic polymer and the aromatic polyester are preferred to be filtered to remove foreign substances.

Especially in the case of olefinic polymer, it is difficult to completely prevent foreign substances in gel form from occurring at the time of production. It would be uneconomical to eliminate such foreign substances in a new process separately from the film making process, so it is preferred to be filtered out in the film forming process. It is advisable to select the filter for this purpose by taking into account the MFR value and film formation speed of the olefinic polymer. Incidentally, the number of the transferred defects having a long diameter of 90 microns or more due to polymer layer (B) on the surface of the separated polymer layer (A) is desired to be within the range from 0 to 50/3000 cm2. From this viewpoint, it is advisable to use the filter having an average aperture of 35 microns or less, or preferably 28 microns or less in particular. The filter may be made of metal or ceramic, but stainless steel is preferred from the viewpoint of recycling. Filter can be manufactured in mesh type, unwoven type or sintering type.

When the unoriented oriented multilayered film is manufactured, electric resistance in melting the olefinic polymer will be reduced by use of olefinic polymer containing 0.001 to 1 wt % or preferably 0.005 to 0.5 wt % of sulfonic acid quaternary phosphonium base (e.g. 3,5-dicarboxybenzenesulfotetra-n-butyl phosphonium). Then sufficient static charge will be applied to each layer constituting the multilayered film, resulting in satisfactory contact between the multilayered film and a cooling drum. The resulting multilayered film will be free of pin holes and other defects, and satisfactory hue will be gained. Furthermore, if aromatic polyester is mixed with sulfonic acid quaternary phosphonium acid, contact between the multilayered film and a cooling drum will be improved.

It is preferred to dry aromatic polyester (A) before being fed to the extruder. The olefinic polymer need not necessarily be dried, but it is recommended to use polyolefin polymer which is dried at the temperature from 100 degrees Celsius to below Tm (melting point).

Said unoriented multilayered film is oriented biaxially to get biaxially oriented multilayered film. To get such biaxially oriented multilayered film, the unoriented multilayered film is heated to the temperature where it can be oriented (for example, Tg (glass transition temperature) of aromatic polyester (A) or higher and not exceeding Tg plus 80 degrees Celsius), and is biaxially drawn. The preferred draw ratio is 2 to 12 in the uniaxial direction, and 5 to 50 in terms of the area in the biaxial direction. This biaxially oriented multilayered film can be manufactured in so-called longitudinal/transverse sequential orientation method wherein unoriented multilayered film is stretched, for example, in the longitudinal direction, then in the transverse direction; or in the longitudinal/transverse simultaneous orientation method wherein it is stretched simultaneously in the longitudinal and transverse directions. Furthermore, this multilayered film can be made into biaxially re-oriented multilayered film wherein it is re-oriented in the uniaxial direction (in the longitudinal or transverse direction), or in the biaxial direction (in the longitudinal and transverse directions). The above mentioned biaxially oriented multilayered film can be further heat-treated at the temperature below Tm (melting point) of the aromatic polyester (A) and is cooled down to the room temperature; then it can be made into biaxially oriented (heat treated) multilayered film having excellent in thermal properties and dimensional stability. The surface of the biaxially oriented multilayered film obtained in this process may be provided, for example, with surface activation treatment (for example, plasma treatment, amine treatment, corona treatment) which is disclosed in Japanese Patent Nos. TOKKAISHO 56-183815(1981) and TOKKAI-SHO 57-30854(1982).

The single layered film free of discharge marks or with the minimum marks obtained by separating polymer layer (A) and polymer layer (B) from the multilayered film according to the present invention can be used for many applications. For example, if the single layered polyester film with the thickness of 3 microns or less, or the very thin single layered film with the thickness of 1 microns or less in particular is to be manufactured independently from the single layered film, breakdown in the orientation process or winding failure in the winding process is likely to occur, so the production is accompanied with difficulties. But it can be easily produced when it is separated from the multilayered film according to the present invention. Such a very thin single layered polyester film is useful as the capacitor film (e.g., film with wall thickness of 3 microns or less), the printer ribbon film (e.g., film with wall thickness of about 5 microns), the magnetic recording media film or QIC base film especially. When the multilayered film according to the present invention is used for the multilayer capacitor, metallic film is deposited on the surface of the multilayered film; then it is slit and is separated to the polymer layer deposited with metallic film; this is an effective way of manufacturing. Also, single polyolefinic layer film is useful as capacitor film (e.g., film with the wall thickness of 3 microns or less) and non-glare film (e.g., film with the wall thickness of 50 microns or less).

Furthermore, by forming the multilayered film in a sandwiched A/B/A layer structure, and by separating layers A on both outer surfaces from the intermediate layer B immediately before use, it is possible to get the extra clean single layer B film featuring very little oxidated film on the surface and minimum foreign substances attached on the surface. It is also possible to get the extra clean single layer B film featuring very little oxidated film on the surface and minimum foreign substances attached on the surface by forming the multilayered film in a sandwiched A/B/A/B/A layer structure, and by separating the intermediate layer A. Moreover, two or more biaxially oriented single layered films can be produced simultaneously with high efficiency and economy by separation of all layers from each other from the biaxially oriented multilayered film according to the present invention.

The thermoplastic resin film gained by separating the multilayered film according to the present invention features a low static charge, and there is almost no foreign substance wound into the film roll by static charge or no discharge mark due to electric discharge. As described above, it provides excellent ink applicability for base film for thermal ink-transfer printing ribbon. Further, as base film for magnetic recording, QIC tape in particular, it provides a roll of products with minimum foreign substances wound into the roll. Furthermore, it is also effective for other applications as film.

The following gives more concrete description of the present invention with reference to Examples. The following methods have been used to measure the characteristics:

1. Melt flow rate (MFR)

MFR was measured at the temperature of 230 degrees Celsius with the test load of 2.16 kgf according to the JIS K6758.

2. Intrinsic volume resistance of molten polymer (impedance)

Electrodes were inserted into the molten polymer heated over the melting point of the polymer (Tm plus 15 degrees Celsius), and 50 Hz AC voltage was charged. The electric current running between electrodes have been assumed as intrinsic volume resistance of the molten polymer.

3. Adhesion

The multilayered film was cut onto the piece having a width of 10 mm and a length of 100 mm. The tension (g) was applied when the polyester layer was separated continuously at an angle of 180 degs. at the rate of 2 m/min. This tension was measured. The average value of these tensions for the width of 1 cm (10 mm) were used as adhesion T (g/cm).

4. Melting point

The temperature of the sample (10 mg) was raised at the abrupt rising curve of 20 degrees Celsius/min. using the DSC (Dupont-made V4.OB2000 Model). The temperature corresponding to the top of the heat absorbing peak due to melting was assumed as a melting point.

5. Glass transition temperature

The temperature of the sample (10 mg) was raised at the temperature rise rate of 20 degrees Celsius/min. using the DSC (Dupont-made V4.OB2000 Model), and the glass transfition temperature was measured.

6. Potential charged during separation

The multilayered film slit to a width of 300 mm was separated into each layer at the rate of 150 m/min. or 300 m/min. During this process, a surface potentiometer (Pulsmo-made T1-300) was used to measure the surface potential on each of the polyester layer and olefinic layer at the position of 200 mm after separation, when 50 m was wound up after the rate of 150 m/min. or 300 m/min. had been reached.

7. Electric discharge marks

The 300 mm-wide film separated from the multilayered film at the speed of 150 m or 300 m/min. was wound into a roll, which was loaded into the transfer unit. The 50 meter film was unwound from the roll at the speed of 5 m/min., and mist was sprayed onto the unwound film to count the discharge marks having occurred at this time. The number of the marks per square meter was used to indicate the frequency of the discharge marks.

8. Measuring the small pimple

The film separated from the multilayered film at the rate of 150 m/min. or 300 m/min. was wound in a roll, and the surface of this roll was visually observed. Convexes of 1 mm or more in diameter were counted, and the result was used as the number of small pimples.

9. Transferred defects

After marking the defects of the film within a surface area of 3,000 cm$^2$ with a polariscope using the polarizing plate, a transmission optical microscopy was used to count the defects (including voids), each having a diameter of 90 microns or more without internal nucleus characteristic of defects transferred from other layers. The measurement was used as the number of transferred defects.

EXAMPLE 1

For the polyester material, the polyethylene terephthalate pellets having an intrinsic viscosity of 0.60, blended with 12 mmol % of potassium acetate per dicarboxylic acid component and with 0.3 wt % of kaolin having an average particle diameter of 0.9 microns was used. After having been dried at the temperature of 170 degrees Celsius for three hours, it was fed to the extruder, and was melt-extruded at 280 degrees Celsius. For the polyolefinic material, the pellet of the ethylene random copolymer polypropylene (Tm: 157 degrees Celsius, melt flow rate: 20 g/10 min. ethylene component 4 mol %) containing 0.05 wt % of 3,5-dicarboxybenzenesulfotetra-n-butyl phosphonium and having 0.1 wt % of aggregated silica with an average particle diameter of 0.3 microns added to it, was used. After it was dried at 100 degrees Celsius for one hour, it was fed to another extruder, and was melt-extruded at 280 degrees Celsius (the same temperature as that of polyethylene terephthalate). In this case, ethylene random copolymer polypropylene was filtered and the extruded at the rate of 45 kg/hr. through 30 filters of stainless fiber sintered type with an average aperture of 28 microns. Molten polymers were fed and placed together inside the dies to form a three-layer multilayered structure comprising polyethylene terephthalate/copolymer polypropylene/polyethylene terephthalate layers. After that, it was discharged from the dies; then it was wound on the cooling drum kept at 20 degrees Celsius while electric charge was applied to it. Thus, it was cooled and hardened to form three-layer unoriented multilayered film. This unoriented multilayered film was brought into contact with a heating roll, was heated to 100 degrees Celsius, was stretched 3.6-fold in the longitudinal direction, and immediately was cooled down to 20 degrees Celsius. This operation was followed by the process of stretching 3.9-fold in the transverse direction by a tenter type transverse stretcher at the temperature of 100 degrees Celsius. Then it was provided with heat treatment at 210 degrees Celsius, and was wound up after having been cooled down to the room temperature.

The biaxially oriented multilayered film obtained in this way had a 5-micron thick outer layer of polyethylene terephthalate and a 6-micron thick inner layer of copolymer polypropylene. Adhesion between the polyethylene terephthalate and copolymer polypropylene layers was 0.7 g/cm. During the eight-hour formation of the biaxially oriented multilayered film, the film was satisfactory without any breakdown. Furthermore, surface potential was measured when this multilayered film was separated and wound at the rate of 300 m/min. Measurement was −5 kV on the side of polyethylene terephthalate, and +5 kV on the side of copolymer polypropylene. Flower patterns (electric discharge mark) on the wound polyethylene terephthalate film roll were measured; no flower pattern was observed per square meter. Further, one transferred defect was measured for 3000 cm$^2$. It did not reject ink to such a level as might cause problems when used as base film for thermal ink-transfer printing ribbon; the level was satisfactory. No change was observed in surface roughness of the product film which might be affected by lubricant included in the polyolefinic layer.

EXAMPLE 2

The pellet of polyethylene terephthalate, the same as Example 1, was used for the polyester material, and was melt-extruded under the same conditions as Example 1. For the polyolefinic material, the pellet of random copolymer polypropylene (Tm: 157 degrees Celsius, melt flow rate: 20 g/10 min., ethylene component 4 mol %) containing 0.05 wt % of 3,5-dicarboxybenzenesulfotetra-n-butyl phosphonium and having 0.5 wt % of aggregated silica wuth an average diameter of 0.3 microns added to it, was used. After having been dried at the temperature of 100 degrees Celsius for one hour, it was fed to another extruder, and was melt-extruded at 280 degrees Celsius, the same temperature as that of polyethylene terephthalate. After that, it was cooled, hardened and was brought into close contact under the same condition as those of Example 1, to form three-layer unoriented multilayered film comprising polyethylene terephthalate/copolymer polypropylene/polyethylene terephthalate layers.

The unoriented multilayered film obtained in this way was biaxially oriented under the same conditions as Example 1. The resulting biaxially oriented multilayered film had a 5-micron thick outer layer of polyethylene terephthalate and a 6-micron thick inner layer of copolymer polypropylene, as in the case of Example 1. Adhesion between the polyethylene terephthalate and copolymer polypropylene layers was 0.6 g/cm. Furthermore, surface potential was measured when this multilayered film was separated and wound at the rate of 300 m/min. Measurement was −3 kV on the side of polyethylene terephthalate, and +3 kV on the side of copolymer polypropylene. Flower patterns on the wound polyethylene terephthalate film roll were measured; no flower pattern was observed per square meter. Further, no change was observed in surface roughness which might be affected by silica contained in the copolymer polyolefinic layer; no transferred defect was measured for 3000 cm$^2$. It did not reject ink to such a level as might cause problems when used as base film for thermal ink-transfer printing ribbon; the level was satisfactory.

EXAMPLE 3

The same method as that in Example 1 was employed, except that the polyolefinic material used was the pellet of random copolymer polypropylene (Tm: 157 degrees Celsius, melt flow rate: 30 g/10 min., ethylene component 4 mol %) containing 0.05 wt % of 3,5-dicarboxybenzenesulfotetra-n-butyl phosphonium and having 0.5 wt % of aggregated silica with an average diameter of 0.3 microns added to it. The resulting multilayered film was separated and wound at the rate of 300 m/min. No flower pattern was observed per square meter of the polyethylene terephthalate roll, and one transferred defect was measured for 3000 cm².

EXAMPLE 4

The same method as that in Example 1 was employed, except that for the polyolefinic material, the pellet of random copolymer polypropylene (Tm: 157 degrees Celsius, melt flow rate: 40 g/10 min., ethylene component 4 mol %) containing 0.05 wt % of 3,5-dicarboxybenzenesulfotetra-n-butyl phosphonium and having 0.1 wt % of aggregated silica having an average diameter of 0.3 microns added to it, was used. The resulting multilayered film was separated and wound at the rate of 300 m/min. One flower pattern was observed per square meter of the polyethylene terephthalate roll, and one transferred defect was measured for 3000 cm².

EXAMPLE 5

For the polyester material, the pellet of polyethylene 2,6-naphthalene dicarboxylate (Tm: 263 degrees Celsius, Tg: 113 degrees Celsius) having an intrinsic viscosity of 0.60, blended with 3 mmol % of 3,5-dicarboxybenzenesulfotetra-n-butyl phosphonium with respect to dicarboxylic acid, and 0.3 wt % of $SiO_2$ having an average diameter of 0.12 microns and 0.03 wt % of calcium carbonate per polyester, was used. This was dried at 170 degrees Celsius for 6 hours, and was fed to the extruder to be melt-extruded at 300 degrees Celsius.

The pellet of ethylene random copolymer polypropylene as in Example 1, containing 0.05 wt % of 3,5-dicarboxybenzenesulfotetra-n-butyl phosphonium and having 0.5 wt % of aggregated silica with an average diameter of 0.3 microns added to it, was used.

Both of them were co-extruded in the same way as in Example 1 to produce the three-layered unoriented multilayered film comprising polyethylene 2,6-naphthalene dicarboxylate/copolymer polypropylene/polyethylene 2,6-naphthalene dicarboxylate. In this case, the ethylene random copolymer polypropylene was filtered and extruded at the rate of 45 kg/hr. through 30 filters of stainless fiber sintered type with the average aperture of 28 microns.

The unoriented multilayered film obtained in the above procedure was heated to 130 degrees Celsius by infrared heater, and it was stretched 4.5-fold in the longitudinal direction, immediately after it was cooled down to 20 degrees Celsius. This operation was followed by the process of stretching 5-fold in the transverse direction by a tenter type transverse stretcher at the temperature of 150 degrees Celsius. Then it was provided with heat treatment at 210 degrees Celsius, and was wound up after having been cooled down to the room temperature. It had a 5-micron thick outer layer of polyethylene 2,6-naphthalene dicarboxylate, and a 6-micron thick inner layer of copolymer polypropylene. Adhesion between the polyethylene 2,6-naphthalene dicarboxylate and copolymer polypropylene layers was 0.6 g/cm. Furthermore, surface potential was measured when this multilayered film was separated and wound at the rate of 300 m/min. Measurement was –5 kV on the side of polyethylene 2,6-naphthalene dicarboxylate, and +5 kV on the side of copolymer polypropylene. Three small pimples were measured on the film of the polyethylene 2,6-naphthalene dicarboxylate roll, and it provided a satisfactory level as base film for magnetic recording, for QIC in particular.

EXAMPLE 6

For the polyester material, used was the pellet of polyethylene 2,6-naphthalene dicarboxylate (Tm: 263 degrees Celsius, Tg: 113 degrees Celsius) having an intrinsic viscosity of 0.60, blended with 3 mmol % of 3,5-dicarboxybenzenesulfotetra-n-butyl phosphonium with respect to dicarboxylic acid, and 0.3 wt % of cataroid with an average diameter of 0.12 microns, and 0.03 wt % of calcium carbonate per polyester. This was dried at 170 degrees Celsius for 6 hours, and was fed to the extruder to be melt-extruded at 300 degrees Celsius.

On the other hand, the pellet of copolymer polypropylene as in Example 1, containing 0.05 wt % of 3,5-dicarboxybenzenesulfotetra-n-butyl phosphonium and having 0.5 wt % of aggregated silica with an average diameter of 0.3 microns added to it, was used.

Both of them were co-extruded in the same way as in Examples 1 and 2 to produce five-layered unoriented multilayered film comprising polyethylene 2,6-naphthalene dicarboxylate/copolymer polypropylene/polyethylene 2,6-naphthalene dicarboxylate/copolymer polypropylene/polyethylene 2,6-naphthalene dicarboxylate.

The unoriented multilayered film obtained in the above procedure was stretched, provided with heat treatment and cooled down to 20 degrees Celsius under the same conditions as in Example 3, then it was wound up. It had a 5-micron thick outer and inner layers of polyethylene 2,6-naphthalene dicarboxylate, and a 5-micron thick layer of copolymer polypropylene. Adhesion between the polyethylene 2,6-naphthalene dicarboxylate and polypropylene layers was 0.6 g/cm on each layer boundary. Furthermore, surface potential was measured when five of these multilayered flms were separated and wound at the rate of 300 m/min. Measurement was –5 kV on the side of polyethylene 2,6-naphthalene dicarboxylate, and +5 kV on the side of copolymer polypropylene. Three small pimples were measured on the film of the polyethylene 2,6-naphthalene dicarboxylate roll and it provided a satisfactory level as base film for magnetic recording, for QIC in particular.

Example for Comparison 1

The same method as that in Example 1 was employed, except that polyolefinic material used was the random copolymer polypropylene containing 4 mol % of the same ethylene component as Example 1 (without silica added). The surface potential was measured when the resulting multilayered film was separated and wound. Measurement was –25 kV on the side of polyethylene terephthalate and +20 kV on the side of copolymer polypropylene. Many flower patterns (about 100 patterns per square meter) were observed on the wound polyethylene terephthalate film roll. Ink was rejected when applied to the film, and its level as base film for thermal ink-transfer printing ribbon was not satisfactory.

Example for Comparison 2

When multilayered film was separated in Example for Comparison 1, an electric charge eliminator bar was installed close to the separation point to remove electric charge. The surface potential was reduced; –5 kV on the side of polyethylene terephthalate, and +5 kV on the side of polypropylene. However, many flower pattern were observed (about 100 patterns per square meter). Ink was rejected when applied to the film, and its level as base film for thermal ink-transfer printing ribbon was not satisfactory.

Example for Comparison 3

The same method as that in Example 1 was employed, except that polyolefinic material used was the mixed polypropylene comprising 80% random copolymer polypropylene containing 5 mol % of ethylene component and 20% homopolypropylene (without silica added). The surface potential was measured when the resulting multilayered film was separated and wound. Measurement was −20 kV on the side of polyethylene terephthalate and +20 kV on the side of polypropylene. Thirty flower patterns per square meter were observed on the wound polyethylene terephthalate film roll. Ink was rejected when applied to the film, and its level as base film for thermal ink-transfer printing ribbon was not satisfactory.

Example for Comparison 4

The same method as that in Example 5 was employed, except that polyolefinic material used was the mixed polypropylene comprising 30% random copolymer polypropylene containing 5 mol % of ethylene component and 70% homopolypropylene (without silica added). The surface potential was measured when the resulting multilayered film was separated and wound. Measurement was −30 kV on the side of polyethylene 2,6-naphthalenedicarboxylate, and +30 kV on the side of polypropylene. Fifteen small pimples per roll surface were observed on the wound polyethylene 2,6-naphthlenedicarboxylate film roll. Its level as base film for magnetic recording or QIC in particular was not satisfactory.

EXAMPLE 7

The polyester material used was the pellet of polyethylene terephthalate having an intrinsic viscosity of 0.60 blended with 12 mmol % of potassium acetate with respect to dicarboxylic acid component, and with 0.3 wt % of kaolin having an average particle diameter of 0.9 microns. This was dried at 170 degrees Celsius for 3 hours, and was fed to the extruder to be melt-extruded at 280 degrees Celsius.

For the polyolefinic material, the pellet of polypropylene (Tm: 165 degrees Celsius, melt flow rate: 7 g/10 min.) containing 0.05 wt % of 3,5-dicarboxybenzenesulfotetra-n-butyl phosphonium and having comprising 0.1 wt % of aggregated silica with an average diameter of 0.3 microns added to it, was used. This was dried at 100 degrees Celsius for one hour, and was fed to another extruder to be melt-extruded at 280 degrees Celsius, the same temperature as that of the polyethylene terephthalate. In this case, the polypropylene was filtered and extruded at the rate of 45 kg/hr. through 30 filters of stainless fiber sintered type with the average aperture of 28 microns. Molten polymers were fed and placed together inside the dies to form a three-layer multilayered structure comprising polyethylene terephthalate/polypropylene/polyethylene terephthalate layers. After that, it was discharged from the dies; then it was wound on the cooling drum kept at 20 degrees Celsius while electric charge was applied to it. Thus, it was cooled and hardened to form three-layer unoriented multilayered film. This unoriented multilayered film was brought into contact with the heating roll, and was heated to 100 degrees Celsius, and was stretched 3.6-fold in the longitudinal direction, immediately after it was cooled down to 20 degrees Celsius. This operation was followed by the process of stretching 3.9-fold in the transverse direction by a tenter type transverse stretcher at the temperature of 100 degrees Celsius. Then it was provided with heat treatment at 210 degrees Celsius, and was wound up after having been cooled down to the room temperature.

The biaxially oriented multilayered film obtained in this way had a 5-micron thick outer layer of polyethylene terephthalate and a 6-micron thick inner layer of polypropylene. Adhesion between the polyethylene terephthalate and polypropylene layers was 0.7 g/cm. During the eight-hour formation of the biaxially oriented multilayered film, the film was satisfactory without any breakdown. This multilayered film was separated and wound at the rate of 150 m/min. No flower pattern per square meter was observed on this wound polyethylene terephthalate film roll. It did not reject ink to such a level as might raise problems when used as base film for thermal ink-transfer printing ribbon; the level was satisfactory. No change was observed in surface roughness of the product film which might be affected by lubricant included in the polyolefinic layer.

EXAMPLE 8

For the polyester material used was the same pallet of polyethylene terephthalate as that of Example 7, and was melt-extruded under the same conditions as Example 7.

For the polyolefinic material, the pellet of polypropylene (Tm: 165 degrees Celsius, melt flow rate: 3 g/10 min.) containing 0.05 wt % of 3,5-dicarboxybenzenesulfotetra-n-butyl phosphonium and having 0.1 wt % of aggregated silica having an average diameter of 0.3 microns added to it, was used. This was dried at 100 degrees Celsius for one hour, and was fed to the extruder to be melt-extruded at 280 degrees Celsius, the same temperature as that of the polyethylene terephthalate. After that, it was cooled and hardened under the same conditions as Example 1, and was statically brought into close contact to form three-layer unoriented multilayered structure comprising polyethylene terephthalate/polypropylene/polyethylene terephthalate layers.

The unoriented multilayered film obtained in this way was biaxially oriented under the same conditions as Example 7. The resulting biaxially oriented multilayered film had a 5-micron thick outer layer of polyethylene terephthalate and a 6-micron thick inner layer of copolymer polypropylene, as in the case of Example 7. Adhesion between the polyethylene terephthalate and copolymer polypropylene layers was 0.6 g/cm. This multilayered film was separated and wound at the rate of 150 m/min. No flower pattern per square meter was observed on this wound polyethylene terephthalate film roll. No change was observed in surface roughness of the film product which might be affected by lubricant included in the polyolefinic layer. It did not reject ink to such a level as might cause problems when used as base film for thermal ink-transfer printing ribbon; the level was satisfactory.

EXAMPLE 9

For the polyester material, the pellet of polyethylene 2,6-naphthalene dicarboxylate (Tm: 263 degrees Celsius, Tg: 113 degrees Celsius) having an intrinsic viscosity of 0.60 blended with 3 mmol % of 3,5-dicarboxybenzenesulfotetra-n-butyl phosphonium with respect to dicarboxylic acid, and 0.3 wt % of $SiO_2$ having an average diameter of 0.12 microns and 0.03 wt % of calcium carbonate added to polyester, was used. This was dried at 170 degrees Celsius for 6 hours, and was fed to the extruder to be melt-extruded at 300 degrees Celsius.

For the other, the pellet of polypropylene as in Example 7, containing 0.05 wt % of 3, 5-dicarboxybenzenesulfotetra-n-butyl phosphonium and having 0.5 wt % of aggregated silica with an average diameter of 0.3 microns added to it, was used. Both of them were co-extruded in the same way as in Example 1 to produce three-layered unoriented multilayered film comprising polyethylene 2,6-naphthalene dicarboxylate/polypropylene/polyethylene 2,6-naphthalene dicarboxylate.

The unoriented multilayered film obtained in the above procedure was heated to 130 degrees Celsius by infrared heater, and it was stretched 4.5-fold in the longitudinal direction, immediately after was cooled down to 20 degrees Celsius. This operation was followed by the process of stretching 5-fold in the transverse direction by a tenter type transverse stretcher at the temperature of 150 degrees Celsius. Then it was provided with heat treatment at 210 degrees Celsius, and was wound up after having been cooled down to the room temperature. It had a 5 micron thick outer layer of polyethylene 2,6-naphthalene dicarboxylate, and a 6 micron thick inner layer of polypropylene. Adhesion between the polyethylene 2,6-naphthalene dicarboxylate and polypropylene layers was 0.6 g/cm. Furthermore, this multilayered film was separated and wound at the rate of 150 m/min. Three small pimples per roll surface were observed on the wound polyethylene 2,6-naphthalene dicarboxylate film roll. Its level as base film for magnetic recording or QIC in particular was satisfactory.

EXAMPLE 10

For the polyester material, the pellet of polyethylene 2,6-naphthalene dicarboxylate (Tm: 263 degrees Celsius, Tg: 113 degrees Celsius) having an intrinsic viscosity of 0.60 blended with 3 mmol % of 3,5-dicarboxybenzenesulfotetra-n-butyl phosphonium with respect to dicarboxylic acid, and 0.3 wt % of cataroid having an average diameter of 0.12 microns and 0.03 wt % of calcium carbonate per polyester, was used. This was dried at 170 degrees Celsius for 6 hours, and was fed to the extruder to be melt-extruded at 300 degrees Celsius.

For the other, the pellet comprising of the polypropylene as in Example 7, containing 0.05 wt % of 3,5-dicarboxybenzenesulfotetra-n-butyl phosphonium and having 0.5 wt % of aggregated silica having an average diameter of 0.3 microns added to it, was used.

Both of them were co-extruded in the same way as in Example 7 to produce five-layered unoriented multilayered film comprising polyethylene 2,6-naphthalene dicarboxylate/polypropylene/polyethylene 2,6-naphthalene dicarboxylate/polypropylene/polyethylene 2,6-naphthalene dicarboxylate.

The unoriented multilayered film obtained in the above procedure was stretched, provided with heat treatment and cooled down to the room temperature and then it was wound up, under the same conditions as in Example 5. It had a 5 micron thick outer and inner layers of polyethylene 2,6-naphthalene dicarboxylate, and a 5-micron thick layer of copolymer polypropylene. Adhesion between the polyethylene 2,6-naphthalene dicarboxylate and polypropylene layers was 0.6 g/cm on each layer boundary. Furthermore, five of these multilayered films were separated and wound at the rate of 150 m/min. Three small pimples per roll surface were observed on the wound polyethylene 2,6-naphthalene dicarboxylate film roll. Its level as base film for magnetic recording or QIC in particular was satisfactory.

Example for Comparison 5

The same method as that in Example 1 was employed, except that polyolefinic material used was the same polypropylene as that of Example 7 (without silica added). The surface potential was measured when the resulting multilayered film was separated and wound. Measurement was +20 kV on the side of polyethylene terephthalate and −25 kV on the side of polypropylene. Many flower patterns(about 100 patterns per square meter) were observed on the wound polyethylene terephthalate film roll. Ink was rejected when applied to the film, and its level as base film for thermal ink-transfer printing ribbon was not satisfactory.

Example for Comparison 6

When multilayered film was separated in Example for Comparison 5, an electric charge eliminator bar was installed close to the separation point to remove electric charge. The surface potential was reduced; +5 kV on the side of polyethylene terephthalate, and −5 kV on the side of polypropylene. However, many flower patterns were observed (about 100 patters per square meter). Ink was rejected when applied to the film, and its level as base film for thermal ink-transfer printing ribbon was not satisfactory.

EXAMPLE 11

For the polyester material, the pellet of polyethylene terephthalate (Tm: 265 degrees Celsius, Tg: 68 degrees Celsius) having an intrinsic viscosity of 0.60 blended with 3 mmol % of 3, 5-dicarboxybenzenesulfotetra-n-butyl phosphonium per carboxylic acid component and 0.3 wt % of kaolin with an average diameter of 0.9 microns, was used. This was dried at 170 degrees Celsius for 3 hours, and was fed to the extruder to be melt-extruded at 280 degrees Celsius.

For the other, the pellet of polymethylpentene (Tm: 235 degrees Celsius, melt flow rate: 26 g/10 min.) containing 0.05 wt % of 3,5-dicarboxybenzenesulfotetra-n-butyl phosphonium and having 0.15 wt % of aggregated silica with an average diameter of 0.3 microns added to it, was used. The polymethylpentene was dried at 100 degrees Celsius for one hour, and fed to another extruder to be filtered and extruded at the rate of 45 kg/hr. at the temperature of 280 degrees Celsius through 30 filters (6 inch diameter) of stainless fiber sintered type with the average aperture of 35 microns.

Both of the molter polymers were fed and placed together inside the dies to form a three-layer multilayered structure comprising polyethylene terephthalate/polymethylpentene/polyethylene terephthalate layers. After that, they were discharged from the dies; then it was wound on the cooling drum kept at 20 degrees Celsius while electric charge was applied to it. Thus, it was cooled and hardened to form three-layer unoriented multilayered film. This unoriented multilayered film was brought into contact with the heating roll, and was heated to 100 degrees Celsius, was stretched 4.0-fold in the longitudinal direction, immediately after it was cooled down to 20 degrees Celsius. This operation was followed by the process of stretching 4.0-fold in the transverse direction by a tenter type transverse stretcher at the temperature of 100 degrees Celsius. Then it was provided with heat treatment at 220 degrees Celsius, and was wound up after having been cooled down to the room temperature.

The biaxially oriented multilayered film obtained in this way had a 5-micron thick outer layer of polyethylene terephthalate and a 6-micron thick layer of polymethylpentene. No mark of electric discharge was observed on the polyethylene terephthalate layer separated from the multilayered film. Forty-five fish eyes per 3000 cm$^2$ were found on the polymethylpentene layer, and eighteen transferred defects were observed on the separated polyethylene terephthalate layer. The filter pressure was 50 kg/cm$^2$ (the extrusion pressure at this time was 100 kg/cm$^2$), and high-speed film making efficiency was excellent. There was no unevenness of film thickness or breakdown due to orientation.

The polyethylene telephthalate film did not reject ink, when it used as base film for thermal ink-transfer printing ribbon, and the level of the surface defect was satisfactory.

EXAMPLE 12

For the polyester material, the pellet of polyethylene terephthalate as in Example 1 was used, and was melt-extruded under the same condition as those of Example 1.

For the polyolefin material, the pellet of random copolymer polypropylene (Tm: 157 degrees Celsius, melt flow rate: 20 g/10 min. ethylene component 4 mol %) containing 0.05 wt % of 3,5-dicarboxybenzenesulfotetra-n-butyl phosphonium and having 0.5 wt % of cross-linked silicone resin with an average particle diameter of 0.3 microns added to it, was used. After it was dried at 100 degrees Celsius for one hour, it was fed to another extruder, and was melt-extruded at 280 degrees Celsius, the same temperature as that of polyethylene terephthalate. Then it was cooled and hardened under the same conditions as Example 1, and was statically brought into close contact to form three-layer unoriented multilayered structure comprising polyethylene terephthalate/copolymer polypropylene/polyethylene terephthalate layers.

The unoriented multilayered film obtained in this way was biaxially oriented under the same conditions as Example 1. The resulting biaxially oriented multilayered film had a 5-micron thick outer layer of polyethylene terephthalate and a 6-micron thick inner layer of copolymer polypropylene, as in the case of Example 1. Adhesion between the polyethylene terephthalate and copolymer polypropylene layers was 0.6 g/cm. This multilayered film was separated and wound at the rate of 300 m/min. No flower pattern per square meter was observed on this wound polyethylene terephthalate film roll. No change was observed in surface roughness of the film product which might be affected by cross-linked silicone resin particle included in the copolymer polyolefinic layer. It did not reject ink to such a level as might cause problems when used as base film for thermal ink-transfer printing ribbon; the level was satisfactory.

EXAMPLE 13

The same method as Example 1 was employed, except that the polyester material used was a mixture of 18 wt % of polyethylene terephthalate isophthalate copolymerized with 12 mol % of isophthahc acid, 5 wt % of polyhexamethylene terephthalate isophthalate copolymerized with 10 mol % of isophthalic acid, 47.5 wt % of polybutylene terephthalate, and 29.5 wt % of polyethylene terephthalate. The multilayered film obtained in this way was separated and wound. No flower pattern was observed per square meter of the polyethylene terephthalate roll, and no transferred defect was measured for 3000 cm².

We claims:

1. Biaxially oriented multilayered film wherein;

(A) at least one first polymer layer comprising an aromatic polyester, and (B) at least one second polymer layer comprising an olefinic polymer, said olefinic polymer (a) having a melt flow index is 0.5 to 50 g/10 min., and (b) containing 0.01 to 5 wt % of at least one type of silicon-containing fine particles selected from the group consisting of silica particles and cross-linked silcone resin particles having an average particle diameter of 0.01 to 2 microns present as a static eliminating agent for separation, (C) said first polymer and second polymer layers are laminated alternately with adhesion between them ranging 0.1 to 20 g/cm., (D) the first polymer layer A forms the outermost layer, and (E) the number of electric discharge marks is 5 or less per square meter on the surface of the first polymer layer A when the first polymer layer A and the second polymer layer B are separated.

2. The multilayered film according to claim 1 wherein the melt flow index of the olefinic polymer is 10 to 45 g/10 min.

3. The multilayered film according to claim 1 wherein the melting point of the olefinic polymer is higher than 150 degrees Celsius without exceeding 240 degrees celsius.

4. The multilayered film according to claim 1 wherein the olefinic polymer is a homopolymer or copolymer of an alpha-olefin having a carbon number of 2 to 10.

5. The multilayered film according to claim 4 wherein the olefinic polymer is an ethylene-propylene copolymer.

6. The multilayered film according to claim 4 wherein the olefinic polymer is polymethylpentene.

7. The multilayered film according to claim 1 wherein the silicon-containing fine particles in the olefinic polymer are silica.

8. The multilayered film according to claim 1 wherein adhesion between the first polymer layer A and second polymer layer B ranges from 0.1 to 10 g/cm.

9. The multilayered film according to claim 1 wherein the number of electric discharge marks is 3 or less per square meter on the surface of the first polymer layer A.

10. The multilayered film according to claim 1 wherein the aromatic polyester is polyethylene terephthalate or polyethylene 2,6-naphthalate.

11. The multilayered film according to claim 1 wherein the aromatic polyester is copolymerized polyethylene terephthalate or copolymerized polyethylene 2,6-naphthalate.

12. The multilayered film according to claim 1 wherein the number of defects transferred from the second polymer layer B onto the surface of the first polymer layer A, said defects each having a diameter of 90 microns or more, is 0 to 50 for 3000 cm².

13. Film comprising the first polymer layer obtained by separation from the multilayered film according to claim 1.

14. Film comprising the second polymer layer obtained by separation from the multilayered film according to claim 1.

* * * * *